United States

Toda et al.

4,012,124

Mar. 15, 1977

[54] ADJUSTABLE MOUNTING DEVICE FOR OPTICS LENS SYSTEMS

[75] Inventors: Katuhiko Toda, Yokohama; Mamoru Shimazaki, Tokyo; Michiharu Suwa, Fuchu, all of Japan

[73] Assignee: Canon Kabushiki Kaisha, Tokyo, Japan

[22] Filed: May 16, 1975

[21] Appl. No.: 578,269

Related U.S. Application Data

[63] Continuation of Ser. No. 396,299, Sept. 11, 1973, abandoned.

[30] Foreign Application Priority Data

Sept. 14, 1972  Japan .............................. 47-92339

[52] U.S. Cl. .............................. 350/187; 350/255
[51] Int. Cl.² .......................................... G02B 15/14
[58] Field of Search ........................... 350/187, 255

[56] References Cited
UNITED STATES PATENTS

| 2,811,080 | 10/1957 | Harter et al. | 350/255 |
| 2,890,639 | 6/1959 | Meixner | 350/255 |
| 3,437,404 | 4/1969 | Seedhouse | 350/187 |
| 3,744,884 | 7/1973 | Filipovich | 350/187 |

*Primary Examiner*—John K. Corbin
*Assistant Examiner*—Conrad Clark
*Attorney, Agent, or Firm*—Toren, McGeady and Stanger

[57] ABSTRACT

The present invention relates to a device to adjust the position of optics lens systems which are movable relative to each other, and is characterized in that the device is equipped with a plural number of cam grooves variable relative to each other to adjust the position, frames to support the optical elements composing said optic lens system and springs forcing said frames to always be engaged in said adjusting cam grooves, whereby the forcing springs present forcing forces to compensate the components along the directions to move said adjusting cam grooves of the forces given to said plural number of said adjusting cam grooves.

14 Claims, 6 Drawing Figures

ADJUSTABLE MOUNTING DEVICE FOR OPTICS LENS SYSTEMS

This is a continuation of application Ser. No. 396,299 which was filed Sept. 11, 1973 and is now abandoned.

BACKGROUND OF THE INVENTION

1. Field of the Invention

The present invention relates to a device to adjust the position of optical len which are movable relative to each other, and particularly to a device to adjust the position of the optics of a zooming mechanism or the like movable along the optical axis.

2. Description of the Prior Art

In case of the zoom lenses for motion picture cameras or the like in which the focusing distance is to be varied continuously, while at the same time the focusing plane is to coincide with the plane of the photosensitive material, there often takes place errors in the position of the focusing plane due to manufacturing errors of the elements or assembly errors. In case these errors exist, the photographs taken are out of focus no matter how exactly the focusing is carried out with the distance measuring mechanism, because the focusing point does not coincide with the film plane in the middle focusing distance during the zooming operation. Until now there was no other way to avoid the focusing error by the zooming operation than to check strictly the manufacturing error of the elements, while as the zooming ratio increases the manufacturing limit has become more limited so that the manufacturing accuracy far beyond the working capacity of the element has come to be desired.

Under such circumstance a method has been adopted, whereby the manufacturing accuracy of the cam grooves to move the zooming lenses are allowed to remain within a certain range, and only one side of the walls of the cam grooves is worked with high accuracy while the other side of the walls of the cam grooves is not worked with as high an accuracy leaving some space between the shaft inserted in the cam grooves and the cam grooves, in such a manner that the cam grooves can be manufactured easily as wide grooves, while the shafts of the zooming lenses are kept always pressed against the side worked with high accuracy of the walls of the cam grooves, when the zooming lenses are moved along such cam grooves.

In such a case, the cam grooves have to be provided inclined to the optical axis of the zooming lenses to be moved in such a manner that at some places the angle of this inclination becomes so large that between the shaft of the zooming lenses and the cam grooves there often takes place components of forces along the direction perpendicular to the optical axis when the shafts of the zooming lenses are pressed by the ordinary spring along only one direction, whereby the components of forces work along the direction to rotate the zooming operation ring so that at the end of the zooming operation, the zooming operation ring and the so called cam ring are rotated a little by the above rotating forces in such a manner that the zooming lenses are moved along the direction of the optical axis or are inclined toward the optical axis, which is very inconvenient.

SUMMARY OF THE INVENTION

One of the objects of the present invention relates to a device to adjust the position of the optics such as the zooming optics movable relative to each other and comprises a plural number of cam grooves relatively variable to each other to adjust the position, means to support the optical elements forming said optics and forcing means to force said supporting means to be always engaged with said adjusting means, whereby said forcing means issue components to compensate the components along the direction to move said position adjusting means of the forces, in such a manner that the focusing error due to zooming might be kept as small as possible.

Another object of the present invention is to offer an equipment to adjust the position of the optics such as the zooming optics movable relative to each other, whereby the manufacturing is easy and the manufacturing cost can be reduced.

DESCRIPTION OF THE PREFERRED EMBODIMENT

Figure 1:
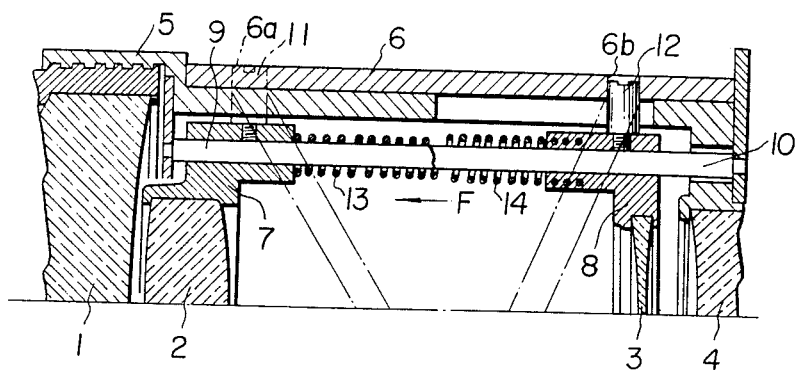
FIG. 1 shows an embodiment of the equipment to adjust the position of the optics movable relative to each other according to the present invention, whereby the equipment is applied in the zooming lens mechanism having a focusing lens 1.
Figure 2:
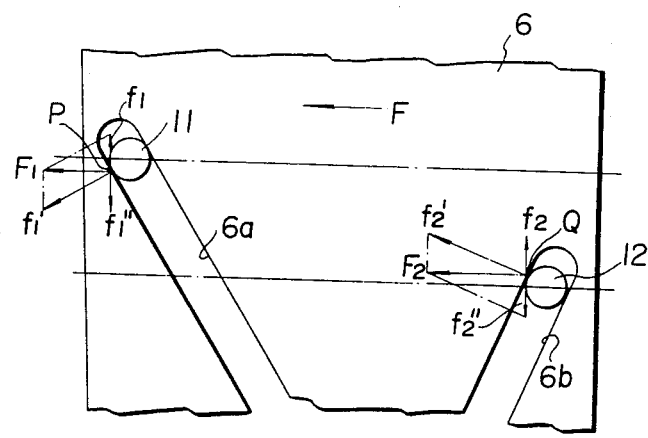
FIG. 2 shows the zooming operation ring 6 of FIG. 1 in development.

FIG. 1 shows the equipment according to the present invention in section, whereby the equipment is applied in the zooming lens mechanism having a focusing lens. In the drawing, 1 is a focusing lens, 2 a lens with variable magnification, 3 a correcting lens, 4 a lens building a picture. 5 is an adjustable lens holding cylinder to move the focusing lens along the direction of the optical axis, 6 a rotary zooming operation ring. 7 is a frame holding the lens with variable magnification, 8 a frame holding the correcting lens 3, whereby both frames 7 and 8 are respectively inserted in guide means 9 and 10 in such a manner that they are movable along the direction of the optical axis. On these frames 7 and 8 shafts 11 and 12 are respectively mounted, which shafts are respectively inserted in the cam grooves 11 and 12 of the above mentioned zooming operation ring 6. 13 is a coil spring arranged around the guide means 9, being compressed, lying on the fixing part of the zooming lens mechanism with its right end and on the frame 7 holding the lens with variable magnification with its left end in such a manner that the holding frame 7 is always pressed along the direction of the arrow F in the drawing. Numeral 13 is a coil spring arranged around the guide means 10, fixed on the holding frame 8 with its right end and, always in a stretched state, on the fixed part of the zooming lens mechanism with its left end, in such a manner that in this way the correcting lens 3 is always pressed along the direction of the arrow F in the drawing. Because the guide means 9 and 10 are coated with oil or polished on the periphery so that the above mentioned frame can move smoothly, there is a danger that the surface of the guide frames 9 and 10 will reflect the light coming from the photographic object. In this connection the surface of the above mentioned coil springs 13 and 14 arranged around the above mentioned means 9 and 10 is chemically treated in order that these guide means 9 and 10 should not reflect the light coming from the photographic object. FIG. 2 shows the zooming operation ring 6 of FIG. 1 in development, whereby the coil springs 13 and 14 and others are omitted. The cam grooves 6a and 6b to move the lens 2 with variable magnification and the correcting lens 3 respectively along the direction of the optical axis are provided so as to cross with each other as is shown in the drawing, in which the shafts 11 and 12 assume respectively the positions with the lenses 2 and 3 at the end of the wide angle side. The above mentioned coil springs 13 and 14 respectively compose the means to always force the shafts 11 and 12 on the lens holding frames 7 and 8 toward the surface of the left walls of the cam grooves 6a and 6b. How the forces of these forcing means work upon the shafts 11 and 12 is analytically shown in FIG. 2. When the lens with variable magnification and the correcting lens (hereinafter called briefly zooming lens) are at the wide angle side, the shafts 11 and 12 are under the forces along the direction of the arrow F in FIG. 1 respectively by means of the above mentioned forcing means 13 and 14, whereby these forces can, when concretely analysed, be expressed in the forces which the shafts 11 and 12 give to the surface of the left walls of the cams grooves 6a and 6b respectively at the contact points P and Q along the direction of the arrow F, namely $F_1$ and $F_2$. Which of these forces $F_1$ and $F_2$ is larger than the other depends upon the pressing force of the above mentioned forcing means 13 and the pulling force of the above mentioned forcing means 14. However in the drawing when the force $F_1$ is greater than $F_2$ as is shown, because here the fact is taken in consideration that when the shafts are moved from the wide angle side to the telephoto side, the compression $F_1$ given to the shaft 11 increases gradually while the tension given to the shaft 12 decreases gradually. When these forces $F_1$ and $F_2$ are analysed in the components perpendicular to the surface of the walls of the cam grooves at the contact points P and Q of the shafts 11 and 12 with the walls of the cam grooves, the force $F_1$ consists of the components $f_1'$ and $f_1$ while the force $F_2$ consists of the components $f_2'$ and $f_2$, as is shown in the drawing. Of these components, those $f_1'$ and $f_2'$ perpendicular to the walls of the cam grooves are the forces which the cam grooves receive respectively from the shafts 11 and 12, whereby these cam grooves are allowed only to rotate in planes perpendicular to the optical axis and are not allowed to move along the direction of the optical axis, being in a fixed state at both sides in such a manner that forces which are equal in the magnitude to the above mentioned components $f_1'$ and $f_2'$ take place along the direction opposing to those of the components so that the influence of the components $f_1'$ and $f_2'$ can be avoided. Hereby the components $f_1$ and $f_2$ which are the forces to rotate the aforementioned zooming operation ring 6 at the contact points P and Q can not be avoided. When both forces $F_1$ and $F_2$ are working along the direction of the arrow $F_1$ as shown in the drawing, the component $f_1$ works upwards while the component $f_2$ works downwards in the drawing in such a manner that both components compensate each other. The counterforces of the components $f_1'$ and $f_2'$ which the surface of the walls of the cam grooves give to the shafts 11 and 12 works as is expressed in $f_1''$ and $f_2''$. If there is no coil spring 14 provided, the zooming operation ring 6 is given a force to try to rotate the ring along the direction of the component $f_1$ by means of the shaft 11 and if there is further a play between the cam groove 6a and the shaft 11, even at the end of the zooming operation the rotating force $f_1$ still remains, trying to rotate the zooming operation ring 6 along the direction of the component $f_1$ so that an error takes place between the shaft 11 and the cam groove, reducing the accuracy of the zooming, which is inconvenient. The same can be said when the coil spring is provided while the coil spring is not, because a rotating force such as $f_2$ still exists.

Figure 3:
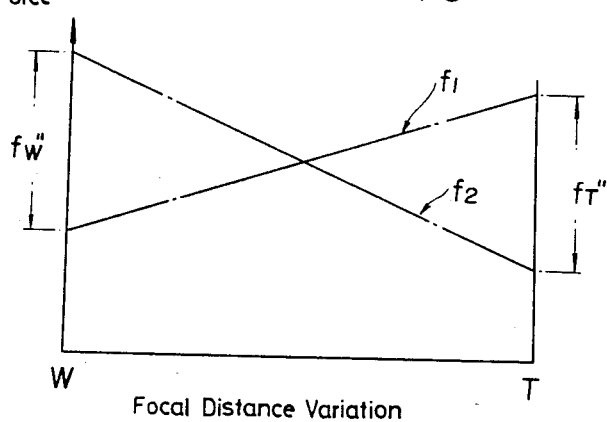
FIG. 3 shows a diagram of the variation of the rotating forces working on the zooming operation ring 6 of FIG. 1 at the time of operation.

As mentioned above, according to the present invention, the coil springs 13 and 14 are arranged in such a manner that the components $f_1$ and $f_2$ trying to rotate the zooming operation ring 6 having the cam grooves 6a and 6b as position adjusting means compensate each other, so that it is possible to reduce the remaining rotating forces as small as possible. So far the case when the zooming lens 2, 3 is at the wide angle side, whereby during the zooming operation the above mentioned rotating forces $f_1$ and $f_2$ vary as shown in FIG. 3. The abscissa shows the variation of the focusing distance of the zooming lens (covering from the widest angle side W to the telephoto side T), while the ordinate shows the variation of the forces $f_1$ and $f_2$ trying to rotate the zooming lens 2 and 3.

The coil spring 13 pressing the lens 2 along the direction of the optical axis is giving out a compression and is compressed gradually as the lens 2 is moved from the wide angle side to the telephoto side in such a manner that the force $F_1$ is also increased, whereby the rotating force $f_1$ as a component increases as shown in FIG. 3. On the other hand as the correcting lens 3 is moved from the wide angle side to the telephoto side along the cam groove 6b, the force of the coil spring 14 pulling the correcting lens 3 is gradually reduced as shown in FIG. 3. The forces of both coil springs are set in such a manner that both lines representing the variation of both rotating forces cross each other during the course of the zooming operation. During the zooming operation the difference between both rotating forces $f_1$ and $f_2$ works to rotate the zooming operation ring 6, whereby it is naturally desired that the difference should be as small as possible. As it is unavoidable that the rotating forces $f_1$ and $f_2$ take place, it is thought to keep the influence of the rotating forces working upon the zooming operation ring 6 as small as possible by so arranging that the both rotating forces should work so as to compensate each other. $f_w''$ and $f_T''$ in FIG. 3 shows the difference between both rotating forces at the widest angle side and the most telephoto side.

Figure 4:
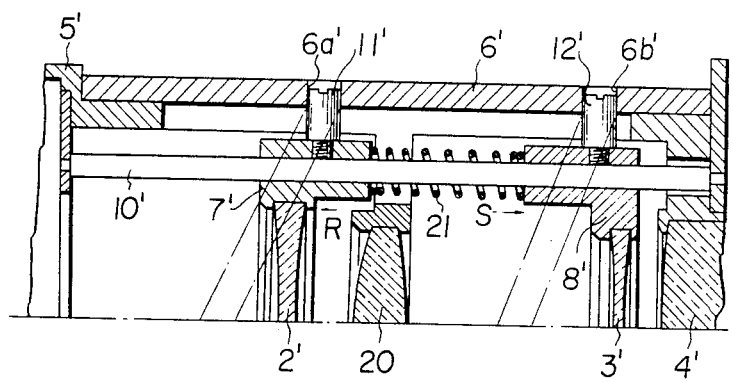
FIG. 4 shows another embodiment of the equipment to adjust the position of the optics movable relative to each other according to the present invention, whereby the equipment is applied in the zooming lens mechanism having a focusing lens 1'.
Figure 5:
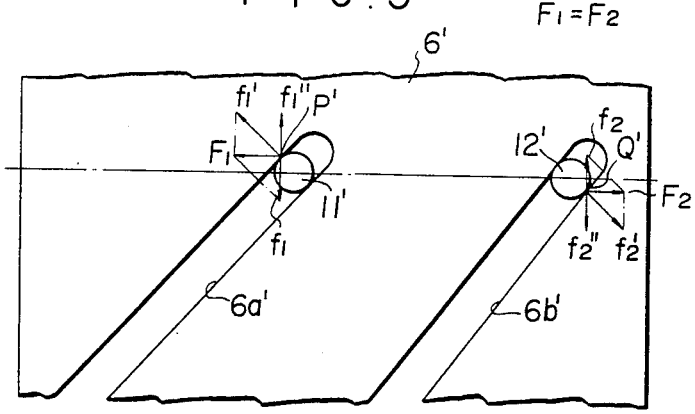
FIG. 5 shows the zooming operation ring 6' of FIG. 4 in development.

FIG. 4 shows another embodiment of the present invention, whereby contrary to the former embodiment the zooming lenses are moved almost along the same direction. The parts corresponding to those of the former embodiment bear the same figures but with ' (dash). Namely 2' is a lens with variable magnification, 3' a correcting lens, 4' a lens building a picture, 5' a lens holding cylinder for focusing, 6' a zooming operation ring, 6a' and 6b' cam grooves, 7' a holding frame of the lens with variable magnification, 8' a holding frame of the correcting lens, 10' a guide means common to the lens with variable magnification and the correcting lens, and 20 a fixed lens serving as optical compensation or the like. 21 is a compression spring arranged around the guide means 10' between the holding frames 7' and 8' of both lenses, always pressing both holding frames 7' and 8' along the direction of the arrow R and S respectively.

Below the way how the forcing means 21 works upon the position adjusting means 6a' and 6b' is explained according to FIG. 4 which shows the zooming operation ring 6' in development. The direction and magnitude of the force which the surface of the internal wall of the cam groove 6a' receives from the forcing means 21 at the contact point P' with the shaft 11' can be expressed in $F_1$ parallel to the optical axis, while the direction and magnitude of the force which the surface of the internal wall of the cam groove 6b' receives at the contact point Q' with the shaft 12' can be represented in $F_2$ parallel to the optical axis. These forces $F_1$ and $F_2$ can be analysed in components $f_1'$ and $f_2'$ perpendicular to the surface of the cam groove and in components $f_1$ and $f_2$ perpendicular to the optical axis as shown in the drawing. $f_1''$ and $f_2''$ are the counter-forces which are given to the shafts 11' and 12' from the surface of the wall. The influence of the components $f_1'$ and $f_2'$ perpendicular to the surface of the walls of the cam grooves can be avoided due to the fact that the zooming operation ring is set so as to be able to move along the direction of the optical axis. On the other hand the influence of the components $f_1$ and $f_2$ perpendicular to the optical axis can not be disregarded, because the forces work so as to rotate the zooming operation ring 6'. However it is so arranged that the components $f_1$ and $f_2$ due to the forcing means 21 should compensate each other, and therefore only the difference between the components works as the force to try to rotate the zooming operation ring and can be kept as small as possible.

Figure 6:
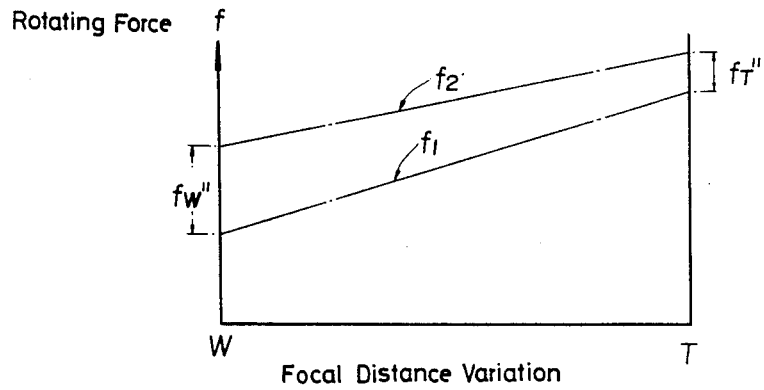
FIG. 6 shows a diagram of the variation of the rotating forces working on the zooming operation ring 6' of FIG. 4 at the time of operation.

In FIG. 6 the variation of the focusing distance is shown along the direction of the abscissa, while the variation of the rotating forces $f_1$ and $f_2$ is shown along the direction of the ordinate as is the case in FIG. 3. The variation of the rotating forces during the course of the zooming operation is taken up in the case when the cam grooves 6a' and 6b' are shaped in such a manner that the relative distance between the zooming lenses 2' and 3' might be small enough. As is clear from the above, the rotating forces $f_1$ and $f_2$ working upon the zooming operation ring 6' are opposed to each other in the direction, so that the effective rotating force is only the difference between the above mentioned forces and therefore can be kept small enough.

As mentioned above according to the present invention the equipment to adjust the position of the optics such as the zooming optics movable relatively to each other is equipped with a plural number of the adjusting means movable relatively to each other such as cam grooves, means to hold the optical elements composing said optics and forcing means to always engage said holding means with said adjusting means such as springs, whereby it is so arranged that the forcing components along the direction to move said means to adjust the position of the forces given to said plural number of said means to adjust the position from said forcing means should compensate to each other respectively, so that said forcing means of the equipment in which it is necessary to adjust the position by conventional means such as springs works so as to rotate the zooming operation ring by means of the surface of the walls of the cam grooves. Thus the present invention has an advantage that the originarily unnecessary rotating forces can be reduced in such a manner that the accuracy of the zooming operation can be increased.

The above mentioned effect is especially remarkable when forcing means work in a certain determined direction in order to absorb plays existing between the cam grooves and the shafts sliding in the grooves, with which the accuracy demanded for shaping the cam grooves need not be so strict that the manufacturing cost can be cut, which is quite advantageous.

The equipment according to the present invention can be applied not only to the zoom lens but also to every equipment to adjust the position of the optics movable relatively to each other.

What is claimed is:

1. A zoom lens mounting mechanism for an optical lens system having at least one variator lens and one compensator lens movable along a common optical axis, said mechanism comprising:
   a. a first support means for said variator lens;
   b. a second support means for said compensator lens;
   c. position-adjusting means rotatable by external actuation and arranged upon rotation to move said variator lens and said compensator lens relative to each other along said optical axis, said position-adjusting means having:
      1. a first cam groove slidably engaging said first support means and capable of moving said first support means along said optical axis through a distance dependent upon the amount of rotation of said position-adjusting means to thereby effect substantial variation of the position of said variator lens on said optical axis; and
      2. a second cam groove slidably engaging said second support means and capable of moving said second support means along said optical axis through a distance dependent upon the amount of rotation of said position-adjusting means in a direction always opposite to that in which said first support means is moved by said first cam groove to thereby effect substantial variation of the position of said compensator lens on said optical axis; and
   d. spring means arranged to exert forces always toward said first and second support means from a common direction almost parallel to said optical axis to urge said first and said second support means for abutment against respective one side walls of said first and said second cam grooves respectively;

whereby the force of said spring means acting on said position-adjusting means through said first and said second support means is reflected at two contact points between said first support means and said first cam groove and between said second support means and said second cam groove to respective directions, with those components of the reflected forces which act individually in either of the directions of rotation of said position-adjusting means being opposite in direction to each other to effectively cancel the spring force in the direction of rotation of said position-adjusting means.

2. A zoom lens mounting mechanism according to claim 1, including guide means provided parallel to said optical axis, wherein said first and said second support means slidably engage with said guide means.

3. A zoom lens mounting mechanism according to claim 2, wherein said guide means has a first guide bar for guiding said movement of said first support means and a second guide bar for guiding said movement of said second support means, and said spring means has a first coil spring arranged on said first guide bar to urge said first support means for abutment against said side wall of said first cam groove and a second coil spring arranged on said second guide bar to urge said second support means for abutment against said side wall of said second cam groove.

4. A zoom lens mounting mechanism according to claim 1, wherein said position-adjusting means is constructed in the form of a hollow cylindrical structure having formed therein said first cam groove and said second cam groove.

5. A zoom lens mounting mechanism for an optical lens system having at least one variator lens and one compensator lens movable along a common optical axis, said mechanism comprising:
 a. a first support means for said variator lens;
 b. a second support means for said compensator lens;
 c. position-adjusting means rotatable by external actuation and arranged upon rotation to move said variator lens and said compensator lens relative to each other along said optical axis, said position-adjusting means having:
  1. a first cam groove slidably engaging said first support means and capable of moving said first support means through a distance dependent upon the amount of rotation of said position-adjusting means to thereby effect substantial variation of the position of said variator lens on said optical axis; and
  2. a second cam groove slidably engaging said second support means and capable of moving said second support means along said optical axis, through a distance dependent upon the amount of rotation of said position-adjusting means in a direction always coincident with that in which said first support means is moved by said first cam groove to thereby effect substantial variation of the position of said compensator lens on said optical axis;
 d. first spring means arranged to urge said first support means for abutment against one side wall of said first cam groove, with a springing force being applied to said first support means from a direction always almost parallel to said optical axis; and
 e. second spring means arranged to urge said second support means for abutment against one side wall of said second cam groove, with a spring force being applied to said second support means from a direction always opposite to that from which the spring force of said first spring means is applied to said first support means,
whereby the spring forces of said first and said second spring means acting on said position-adjusting means through said first and said second support means respectively are reflected at the respective abutment points to respective directions, with those components of the reflected springing forces which individually serve to drive said position-adjusting means for rotation being opposite in direction to each other to effectively cancel the spring actions of said first and second spring means in the direction of rotation of said position-adjusting means.

6. A zoom lens mounting mechanism according to claim 5, wherein said first and said second spring means are combined as a unit to form a single spring arranged betwen said first support means and said second support means.

7. A zoom lens mounting mechanism according to claim 6, wherein said spring is a compressed coil spring abutting at its one end against said first support means and at its opposite end against said second support means.

8. A zoom lens mounting mechanism according to claim 6, wherein said spring is a tensioned coil spring connected at its one end to said first support means and at its opposite end to said second support means.

9. A zoom lens mounting mechanism according to claim 5, wherein said position-adjusting means is constructed in the form of a hollow cylindrical structure having formed therein said first cam groove and said second cam groove.

10. A zoom lens mounting mechanism for an optical lens system having at least one variator lens and one compensator lens movable along a common optical axis, said mechanism comprising:
 a. a first support means for said variator lens;
 b. a second support means for said compensator lens;
 c. a cam tube rotatable by external actuation and arranged upon rotation to move said variator lens and said compensator lens relative to each other along said optical axis, said cam tube having;
  1. a first cam groove slidably engaging said first support means and capable of moving said first support means along said optical axis through a distance dependent upon the amount of rotation of said cam tube to thereby effect substantial variation of the position of said variator lens on said optical axis; and
  2. a second cam groove slidably engaging said second support means and capable of moving said second support means along said optical axis through a distance dependend upon the amount of rotation of said cam tube in a direction always opposite to that in which said first support means is moved by said first cam groove to thereby effect substantial variation of the position of said compensator lens on said optical axis;
 d. guiding means having at least first and second bars arranged in almost parallel to said optical axis within said cam tube, said first bar guiding said movement of said first support means, and said second bar guiding said movement of said second support means;
 e. a first coil spring means arranged on said first bar to urge said first support means for abutment against one side wall of said first cam groove, with a spring force being applied to said first support means from a direction always almost parallel to said optical axis; and
 f. a second coil spring means arranged on said second bar to urge said second support means for abutment against one side wall of said second cam groove, with a spring force being applied to said second support means from a direction always coincident with that from which the spring force of said first coil spring means is applied to said first support means, whereby the spring forces of said first and said second coil spring means acting on said cam tube thorugh said first and said second support means respectively are reflected at the respective abutment points to respective directions, with those components of the reflected spring forces which individually serve to drive said cam tube for rotation being opposite in direction to each other to effectively cancel the spring actions of said first and said second coil spring means in the direction of rotation of said cam tube.

11. A zoom lens mounting mechanism for an optical lens system having at least one variator lens and one compensator lens movable along a common optical axis, said mechanism comprising:
 a. first support means for said variator lens;
 b. a second support means for said compensator lens;
 c. a cam tube rotatable by external actuation and arranged upon rotation to move said variator lens and said compensator lens relative to each other along said optical axis, said cam tube having:
  1. a first cam groove slidably engaging said first support means and capable of moving said first support means along said optical axis through a distance dependent upon the amount of rotation of said cam tube to thereby effect substantial variation of the position of said variator lens on said optical axis; and
  2. a second cam groove slidably engaging said second support means and capable of moving said second support means along said optical axis through a distance dependent upon the amount of rotation of said cam tube in a direction always coincident with that in which said first support means is moved by said first cam groove to thereby effect substantial variation of said position of said compensator lens on said optical axis;
 d. guiding means having at least one bar arranged almost parallel with said optical axis within said cam tube;
 e. a first coil spring means arranged on said bar to urge said first support means for abutment against one side wall of said first cam groove, with a spring force being applied to said first support means from a direction always almost parallel to said optical axis; and
 f. a second coil spring means arranged on said bar to urge said second support means for abutment against one side wall of said second cam groove, with a spring force being applied to said second support means from a direction always almost opposite to that from which the springing force of said first coil spring means is applied to said first support means,
whereby the spring forces of said first and said second coil spring means acting on said cam tube through said first and said second support means respectively, are reflected at the respective abutment points to respective directions, with those components of the reflected spring forces which individually serve to drive said cam tube for rotation being opposite in direction to each other to effectively cancel the spring actions of said first and said second coil spring means in the direction of rotation of said cam tube.

12. A zoom lens mounting mechanism according to claim 11, wherein said first and said second coil spring means are combined with each other to form a single coil spring connected at its one end to said first support means and at its opposite end to said second support means.

13. In a lens mounting mechanism for an optical lens system having at least first and second lenses movable along a common optical axis, the improvement comprising:
 a. a first lens support means for said first lens;
 b. a second lens support means for said second lens;
 c. guiding means for guiding said first and said second lens support means in a manner to permit their movements only along said optical axis;
 d. a cam tube rotatable by external actuation and arranged upon rotation to move said first and said second lenses relative to each other along said optical axis, said cam tube having:
  1. a first cam groove slidably engaging said first lens support means and capable of moving said first lens support means along said optical axis through a distance dependent upon the amount of rotation of said cam tube to thereby effect substantial variation of the position of said first lens on said optical axis; and
  2. a second cam groove slidably engaging said second support means and capable of moving said second lens support means along said optical axis through a distance dependent upon the amount of rotation of said cam tube in a direction always opposite to that in which said first lens support means is moved by said first cam groove to thereby effect substantial variation position of said second lens on said optical axis;
 e. spring means arranged to exert forces always toward said first and said second lens support means from a common direction almost parallel to said optical axis to urge said first and said second lens support means for abutment against respective one side walls of said first and said second cam grooves respectively,
whereby the force of said spring means acting on said cam tube through said first and said second lens support means is reflected at two contact points between said first lens support means and said first cam groove and between said second lens support means and said second cam groove to respective directions, with those components of the reflected forces which act individually in either direction of rotation of said cam tube being opposite in direction to each other to effectively cancel the spring action in the direction of rotation of said cam tube.

14. In a lens mounting mechanism for an optical lens system having at least first and second lenses movable along a common optical axis, the improvement comprising:
 a. a first lens support means for said first lens;
 b. a second lens support means for said second lens;
 c. guiding means for guiding said first and said second lens support means in a manner to permit their movements only along said optical axis;
 d. a cam tube rotatable by external actuation and arranged upon rotation to move said first and said second lenses relative to each other along said optical axis, said cam tube having:
  1. a first cam groove slidably engaging said first lens support means and capable of moving said first lens support means along said optical axis through a distance dpendent upon the amount of rotation of said cam tube to thereby effect substantial variation of the position of said first lens on said optical axis; and 2. a second cam groove slidably engaging said second lens support means and capable of moving said second lens support means along said optical axis through a distance dependent upon the amount of rotation of said cam tube in a direction always coincident with that in which said first lens support means is moved by said first cam groove to thereby effect substantial variation of the position of said second lens on said optical axis;

e. first spring means arranged to urge said first lens support means for abutment against one side wall of said first cam groove, with a spring force being applied to said first support means from a direction always almost parallel to said optical axis; and f. second spring means arrange to urge said second lens support means for abutment against one side wall of said second cam groove, with a spring force being applied to said second sens support means from a direction always opposite to that from which the spring force of said first spring means is applied to said first lens support means, whereby the spring force of said first and said second spring means acting on said cam tube through said first and said second lens support means respectively are reflected at the respective abutment points to respective directions, with those components of the reflected spring forces which individually serve to drive said cam tube for rotation being opposed in direction to each other to effectively cancel the spring actions of said first and said second spring means in the direction of said cam tube.

* * * * *